(12) United States Patent
Leith et al.

(10) Patent No.: US 11,752,822 B1
(45) Date of Patent: Sep. 12, 2023

(54) BOLT ON SUSPENSION KIT FOR INCREASING VEHICLE PAYLOAD

(71) Applicant: Ford Global Technologies, LLC, Dearborn, MI (US)

(72) Inventors: Cameron Leith, Bannockburn (AU); Jonathan Payne, Grenville (AU)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/728,352

(22) Filed: Apr. 25, 2022

(51) Int. Cl.
*B60G 15/06* (2006.01)

(52) U.S. Cl.
CPC ...... *B60G 15/067* (2013.01); *B60G 2204/125* (2013.01); *B60G 2204/128* (2013.01); *B60G 2204/45021* (2013.01); *B60G 2206/41* (2013.01); *B60G 2206/42* (2013.01)

(58) Field of Classification Search
CPC ............ B60G 15/067; B60G 2204/125; B60G 2204/128; B60G 2300/0262; B62D 61/12
See application file for complete search history.

(56) References Cited

U.S. PATENT DOCUMENTS

| | | | |
|---|---|---|---|
| 6,446,746 B1 * | 9/2002 | Bell | B60G 11/107 180/312 |
| 7,237,789 B1 * | 7/2007 | Herman | B60D 1/485 280/490.1 |
| 10,081,290 B2 * | 9/2018 | Fohrenkamm | A01B 51/02 |
| 2002/0157891 A1 * | 10/2002 | Hurlburt | B60K 17/36 280/781 |
| 2007/0145656 A1 * | 6/2007 | Svendsen | F16F 1/18 267/260 |
| 2008/0236437 A1 * | 10/2008 | Shagbazyan | B62D 61/12 105/215.2 |
| 2009/0091101 A1 * | 4/2009 | Leonard | B62D 33/067 280/638 |
| 2009/0224510 A1 * | 9/2009 | Caporali | B62D 33/08 280/482 |
| 2013/0049316 A1 * | 2/2013 | Schwinn | B62D 61/12 280/86.5 |
| 2020/0391661 A1 * | 12/2020 | Lee | B60G 3/01 |

FOREIGN PATENT DOCUMENTS

| | | | |
|---|---|---|---|
| GB | 1270764 A | * | 4/1972 |
| WO | WO-2020116298 A1 | * | 6/2020 |

* cited by examiner

*Primary Examiner* — Drew J Brown
(74) *Attorney, Agent, or Firm* — Burr & Forman LLP; Lorne Forsythe

(57) ABSTRACT

A vehicle suspension system may include a first suspension assembly operably coupling a first wheel to a chassis of a vehicle, a second suspension assembly operably coupling a second wheel to the chassis where the first and second wheels form a pair of front wheels, a third suspension assembly operably coupling a third wheel to the chassis, a fourth suspension assembly operably coupling a fourth wheel to the chassis where the third and fourth wheels forming a first pair of rear wheels, and a payload extension kit that is attachable to the chassis non-permanently. The payload extension kit may include a fifth suspension assembly operably coupling a fifth wheel to a sub-frame extension of the payload extension kit, and a sixth suspension assembly operably coupling a sixth wheel to the sub-frame extension, where the fifth and sixth wheels form a second pair of rear wheels.

17 Claims, 9 Drawing Sheets

BOLT ON SUSPENSION KIT FOR INCREASING VEHICLE PAYLOAD

TECHNICAL FIELD

Example embodiments generally relate to vehicle suspension and, more particularly, relate to a suspension system that employs a bolt on architecture for efficient increase in payload capacity.

BACKGROUND

Vehicles commonly employ different types of suspension based on planned usage, and performance goals. Accordingly, given that certain vehicle types made by different manufacturers compete with each other in the marketplace, trends can develop whereby certain vehicle types tend to coalesce around using the same types of suspension. Thus, for example, many pickup trucks tend to employ traditional leaf springs and live rear axles for rear suspension instead of independent rear suspension.

All that being said, even within a given type of vehicles, there may be variants that require different suspension solutions. Thus, for example, where variants are intended to differ in payload capacity, it is possible that dramatically different suspension solutions may be desirable. These different solutions typically necessarily mean dramatic changes to not only the suspension, but also to the chassis of the vehicle.

For example, a truck having a chassis and corresponding suspension design with four wheels may have a limited payload capacity. Meanwhile, a higher payload capacity variant could be made by adding a third axle, and a third pair of wheels. Such a variant would normally require changes to the frame, suspension, tires, and/or driveline relative to the variant with four wheels and the limited payload capacity. Whereas manufacturers often undertake this willingly in order to serve important market segments, doing so in a more efficient manner would be very much preferable, if possible. Example embodiments may do just that.

BRIEF SUMMARY OF SOME EXAMPLES

In accordance with an example embodiment, a vehicle suspension system may be provided. The vehicle suspension system may include a first suspension assembly operably coupling a first wheel to a chassis of a vehicle, a second suspension assembly operably coupling a second wheel to the chassis where the first and second wheels form a pair of front wheels, a third suspension assembly operably coupling a third wheel to the chassis, a fourth suspension assembly operably coupling a fourth wheel to the chassis where the third and fourth wheels forming a first pair of rear wheels, and a payload extension kit that is attachable to the chassis non-permanently. The payload extension kit may include a fifth suspension assembly operably coupling a fifth wheel to a sub-frame extension of the payload extension kit, and a sixth suspension assembly operably coupling a sixth wheel to the sub-frame extension, where the fifth and sixth wheels form a second pair of rear wheels.

In another example embodiment, a payload extension kit may be provided. The payload extension kit may operably couple to a chassis of a vehicle having a front pair of wheels and a first rear pair of wheels to increase a payload capacity of the vehicle. The payload extension kit may include a sub-frame extension and a pair of suspension assemblies operably coupling a second pair of rear wheels to the sub-frame extension. The chassis includes a first longitudinal frame member, a second longitudinal frame member, and a transverse frame member extending between the first and second longitudinal frame members. The sub-frame extension includes a first longitudinal sub-frame member, a second longitudinal sub-frame member, and a transverse sub-frame member extending between the first and second longitudinal sub-frame members. The first longitudinal sub-frame member is non-permanently fixed to the first longitudinal frame member, and the second longitudinal sub-frame member is non-permanently fixed to the second longitudinal frame member via both a vertical fixing member and a horizontal fixing member.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
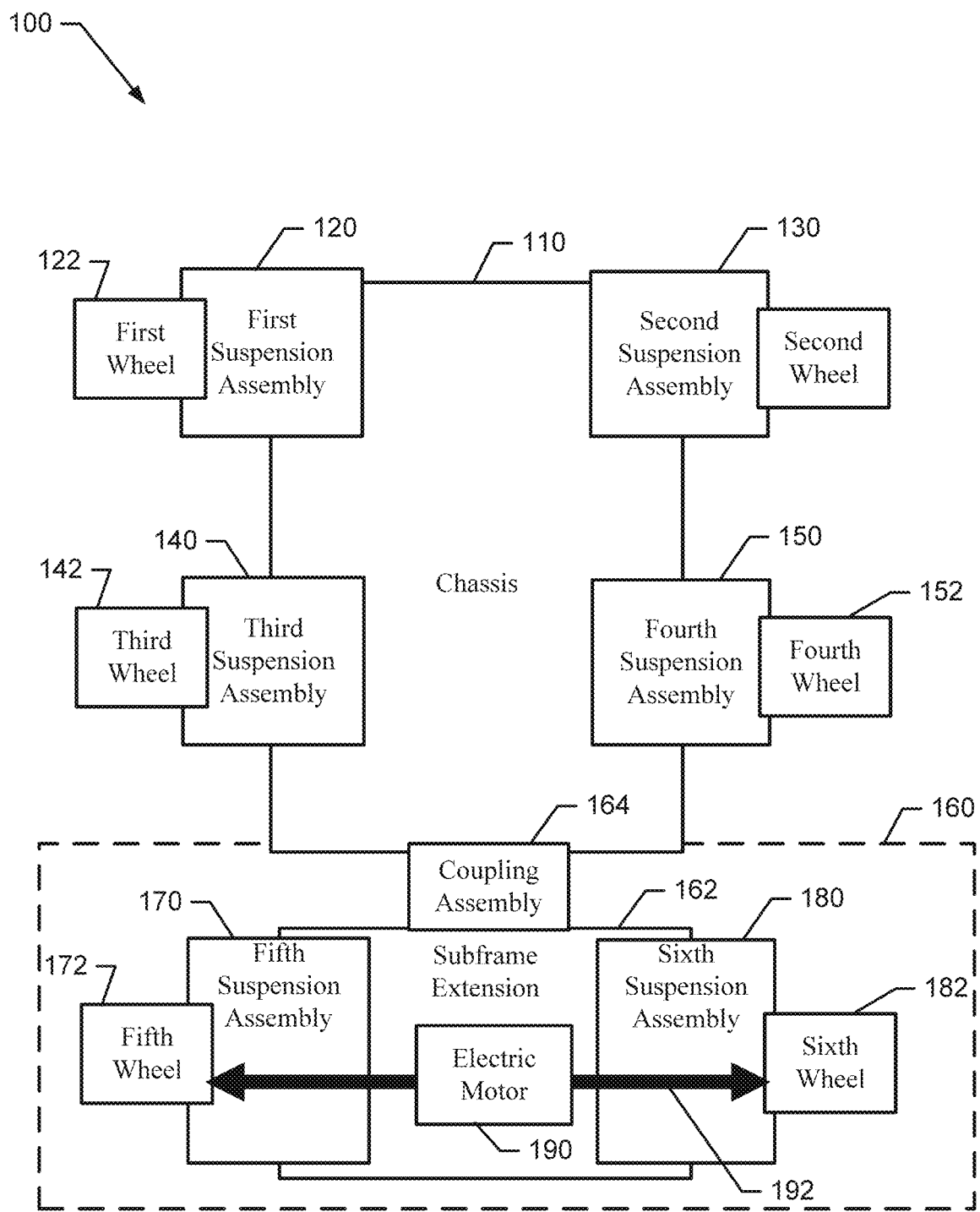
FIG. 1 illustrates a block diagram of a suspension system of a vehicle in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, modification of a base vehicle design to form a variant can often lead to changes that include modifications to the frame, suspension, tires and/or driveline. Nevertheless, the desire to serve many different market segments often drives manufacturers to take on that burden anyway. This situation is particularly true when the variant being considered is aimed at providing a significant increase in payload capacity. For example, for a typical truck frame that includes a frame supporting four wheels and corresponding suspension elements, upgrading the payload capacity by adding another axle and two more wheels would normally require changes to at least the frame and suspension that would effectively comprise a major redesign that would potentially be prohibitively expensive.

Example embodiments, however, may enable the provision of a suspension kit that can be implemented for conversion from a four wheeled variant to a six wheeled variant without any changes to the design changes to the frame (or chassis), suspension, tires or driveline of the base model. In this regard, example embodiments may provide a completely bolt-on kit for going from a four wheeled variant to a six wheeled variant. In some cases, the six wheeled variant may be a six wheel drive (e.g., 6×6) variant. Moreover, in some embodiments, the six wheeled variant may employ a plug-in hybrid electric vehicle (PHEV) hybrid E-axle sixth wheel.

As will be seen in connection with detailed discussions of an example embodiment below, the suspension kit described herein provides a number of advantages in efficiency without any sacrifice in performance. The suspension kit also creates the opportunity to incorporate other unique modifications that further enhance various aspects of performance and robustness. Some of those additional modifications will be discussed in detail below.

FIG. 1 illustrates a block diagram of a vehicle 100 of an example embodiment. The vehicle 100 may include multiple components, subsystems or assemblies, which may be operably coupled (and in some cases affixed) to a chassis 110 of the vehicle. Many of those components, subsystems or assemblies are outside the scope of this disclosure, and are therefore omitted from FIG. 1. However, others that are germane to this disclosure are shown including a first suspension assembly 120 that may support a first wheel 122, and a second suspension assembly 130 that may support a second wheel 132. In an example embodiment, the first and second wheels 122 and 132 may be front wheels. The first and second suspension assemblies 120 and 130 may be operably coupled to the chassis 110, and may either be dependent or independent front suspensions.

The vehicle 100 may also include a third suspension assembly 140 that may support a third wheel 142, and a fourth suspension assembly 150 that may support a fourth wheel 152. In this, the third and fourth wheels 142 and 152 may be rear wheels. The third and fourth suspension assemblies 140 and 150 may be operably coupled to the chassis 110, and may either be dependent or independent rear suspensions. However, the vehicle 100 of some embodiments may be a truck platform (e.g., a pickup truck or sport utility vehicle platform), and therefore the rear suspension is more than likely not an independent suspension.

The vehicle 100 may include various driveline components that render the vehicle 100 operational in the form shown in FIG. 1 along with various body components, interior features and other components that are outside the scope of this disclosure, and which may be changed or modified to create different models in some cases. Generally speaking, the vehicle 100 as described thus far will have a limited payload capacity. That payload capacity may, however, be increased by operably coupling a payload extension kit 160 of an example embodiment to the chassis 110 of the vehicle 100.

The payload extension kit 160 may include a sub-frame extension 162 that is operably coupled to the chassis 110 of the vehicle 100 by a coupling assembly 164. In an example embodiment, the coupling assembly 164 may include only bolt-on connection points. Thus, no welding or other significant modification to the vehicle 100 described above may be required. Instead, the payload extension kit 160 may effectively be bolted onto the chassis 110 of the vehicle 100 without requiring any other changes to the chassis 110, the suspension, the wheels, or the driveline of the vehicle 100.

The payload extension kit 160 may include a fifth suspension assembly 170 that may support a fifth wheel 172, and a sixth suspension assembly 180 that may support a sixth wheel 182. In this, the fifth and sixth wheels 172 and 182 may be supported rearward of the third and fourth wheels 142 and 152, respectively. The fifth and sixth suspension assemblies 170 and 180 may be operably coupled to the sub-frame extension 162, and may either be dependent or independent rear suspensions. However, as noted above, in most cases the fifth and sixth suspension assemblies 170 and 180 will not be independent rear suspensions.

In an example embodiment, the payload extension kit 160 may also include an electric motor 190 operably coupled to a "lazy" or hybrid drive axle 192. Thus, for example, the electric motor 190 may be powered from a battery that may be recharged periodically by plugging in to a power source to make the vehicle 100, particularly after adding the payload extension kit 160, into a PHEV.

As mentioned above, it can be appreciated that the structures or components that are used to define the vehicle 100, and the payload extension kit 160, can vary in different implementations of example embodiments. Thus, FIGS. 2-7 merely illustrate one non-limiting example of structures that may be employed in an example embodiment. Notably, several components that are not germane to the workings of components discussed herein may be removed, fully or partially, to facilitate better visibility to other components that are discussed herein.

Figure 2:
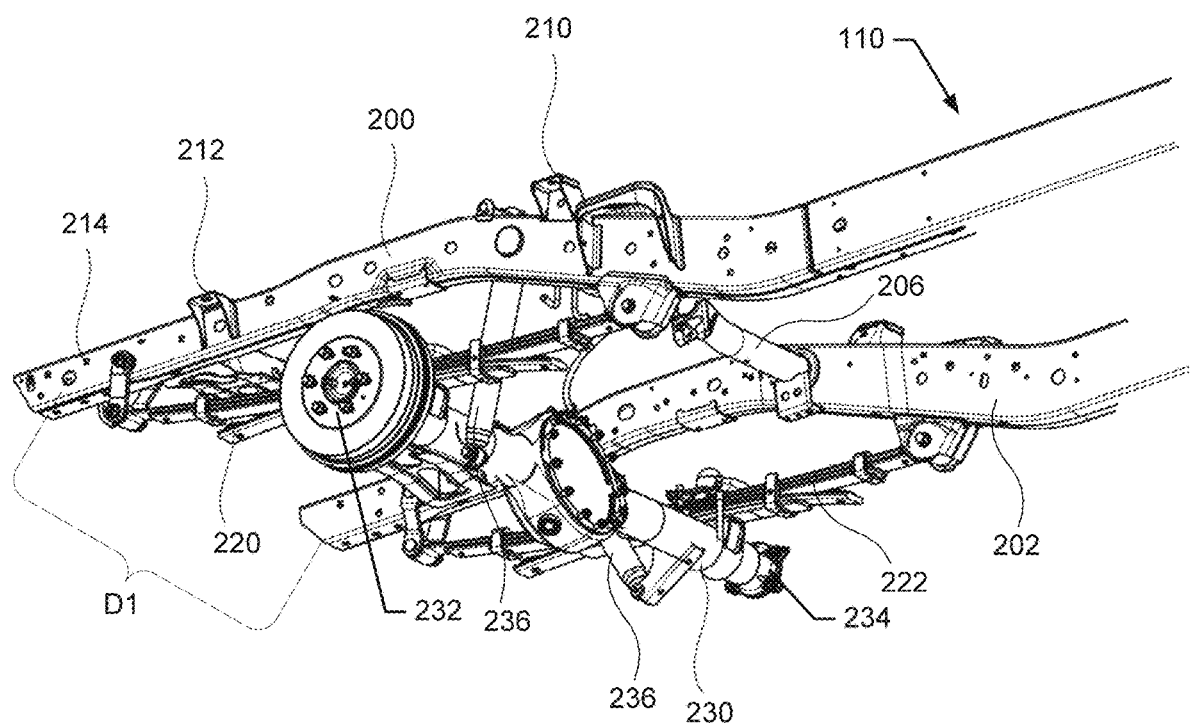
FIG. 2 illustrates a perspective view from below a vehicle looking upward at various components of the suspension system and chassis in accordance with an example embodiment.
Figure 3:
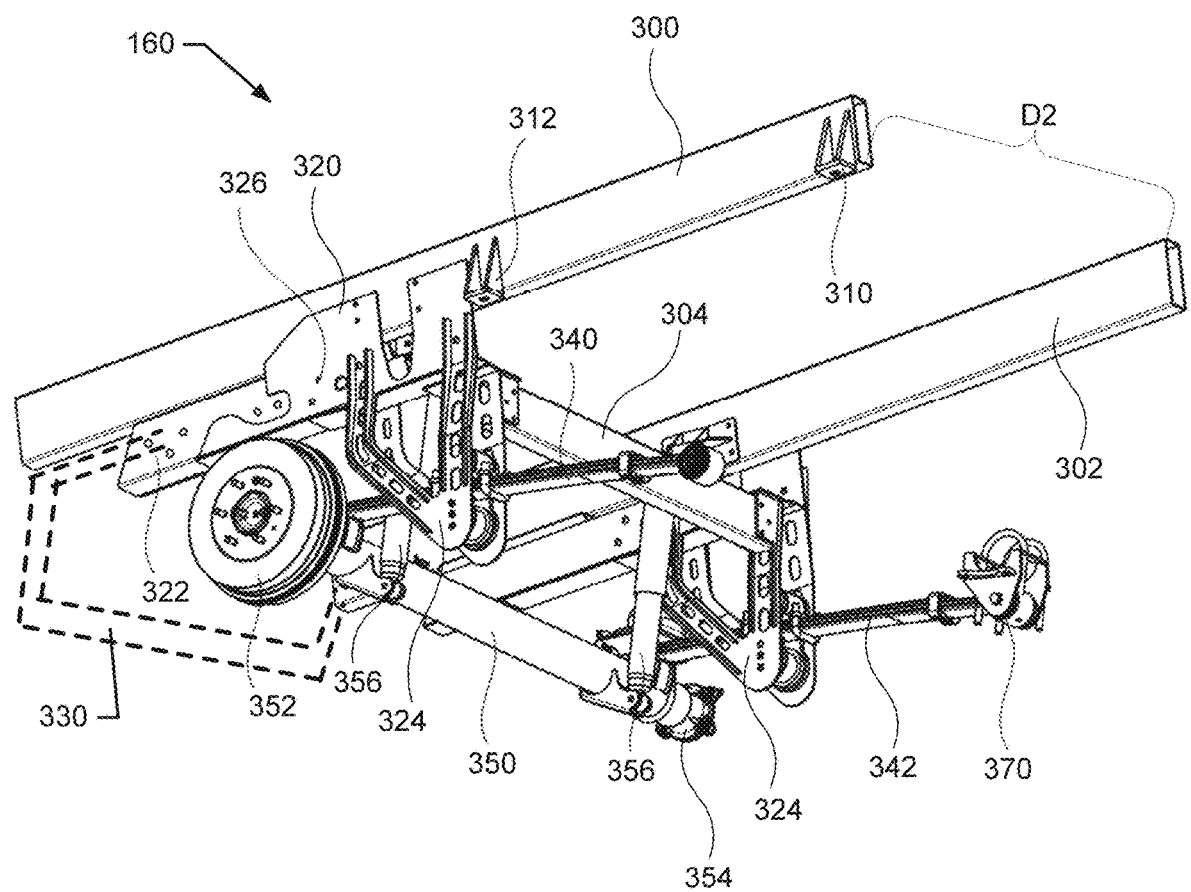
FIG. 3 illustrates a perspective view of a payload extension kit in accordance with an example embodiment.
Figure 4:
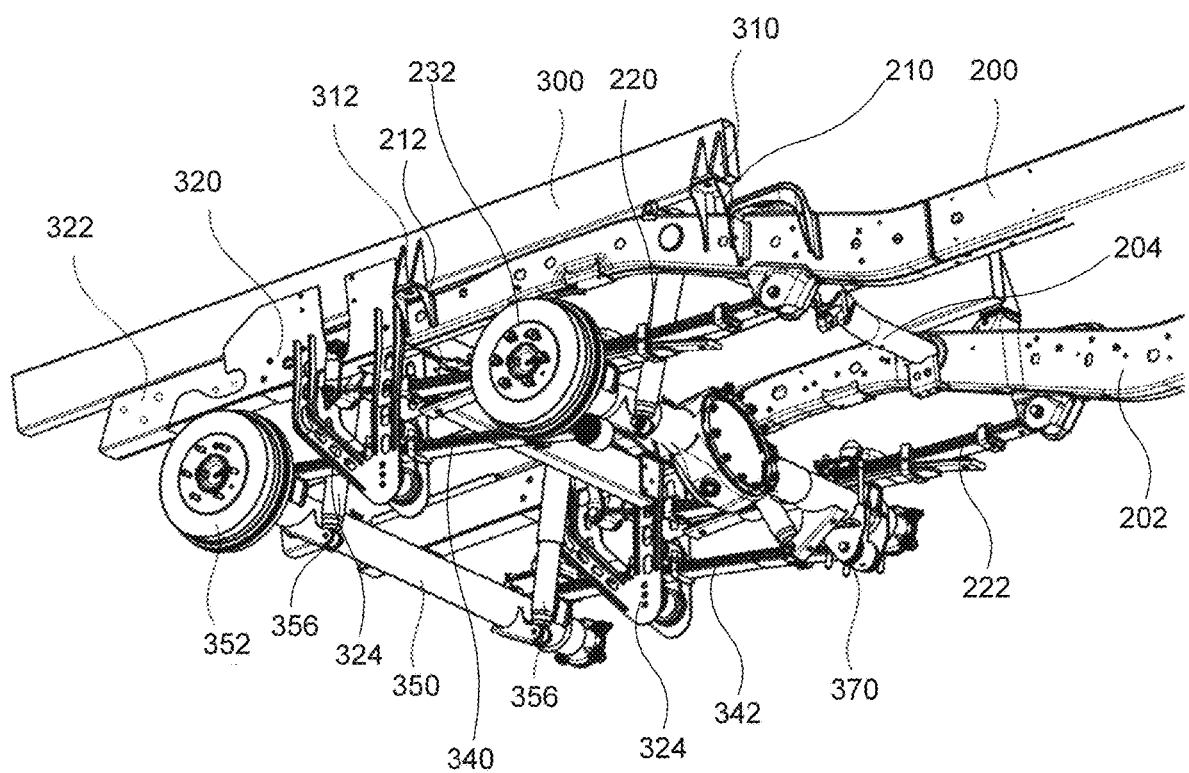
FIG. 4 illustrates a perspective view of the payload extension kit operably coupled to the vehicle in accordance with an example embodiment.
Figure 5:
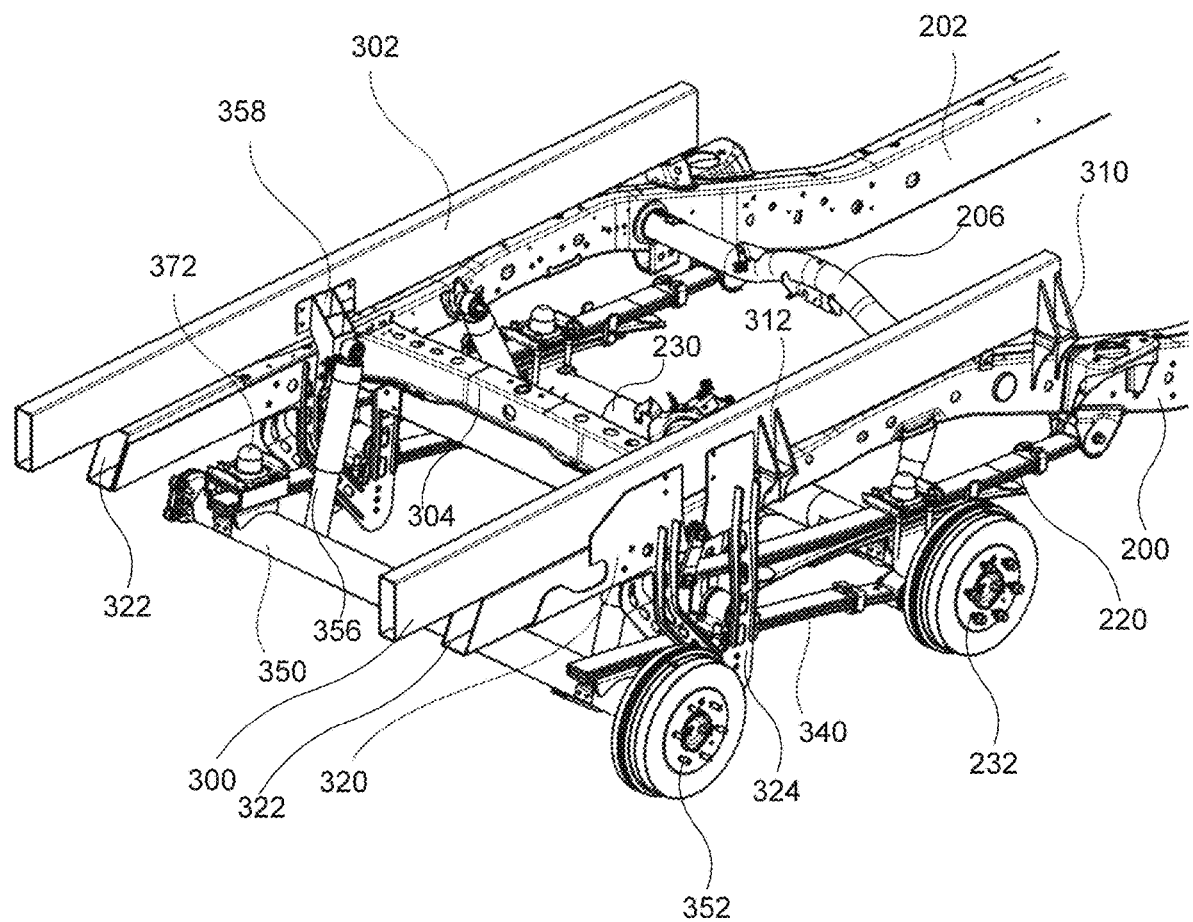
FIG. 5 illustrates another perspective view of the payload extension kit operably coupled to the vehicle in accordance with an example embodiment.
Figure 6:
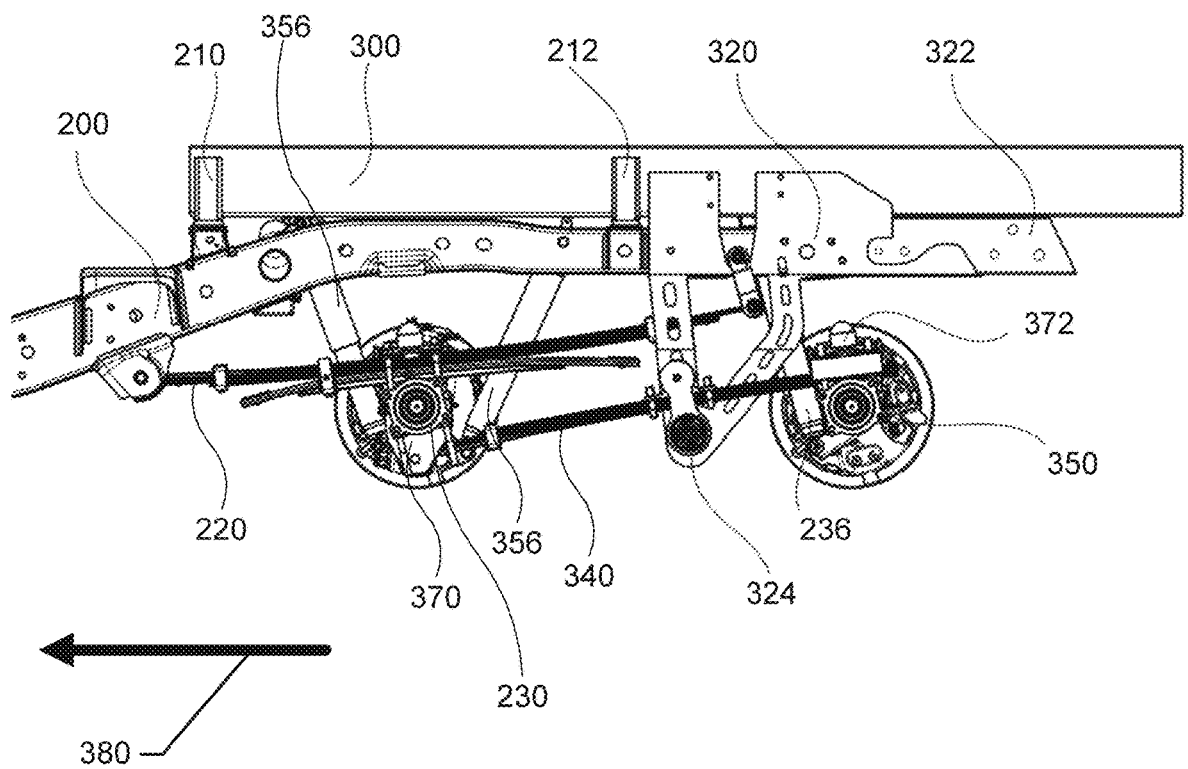
FIG. 6 is a side view of the payload extension kit operably coupled to the vehicle in cross section in accordance with an example embodiment.
Figure 7:
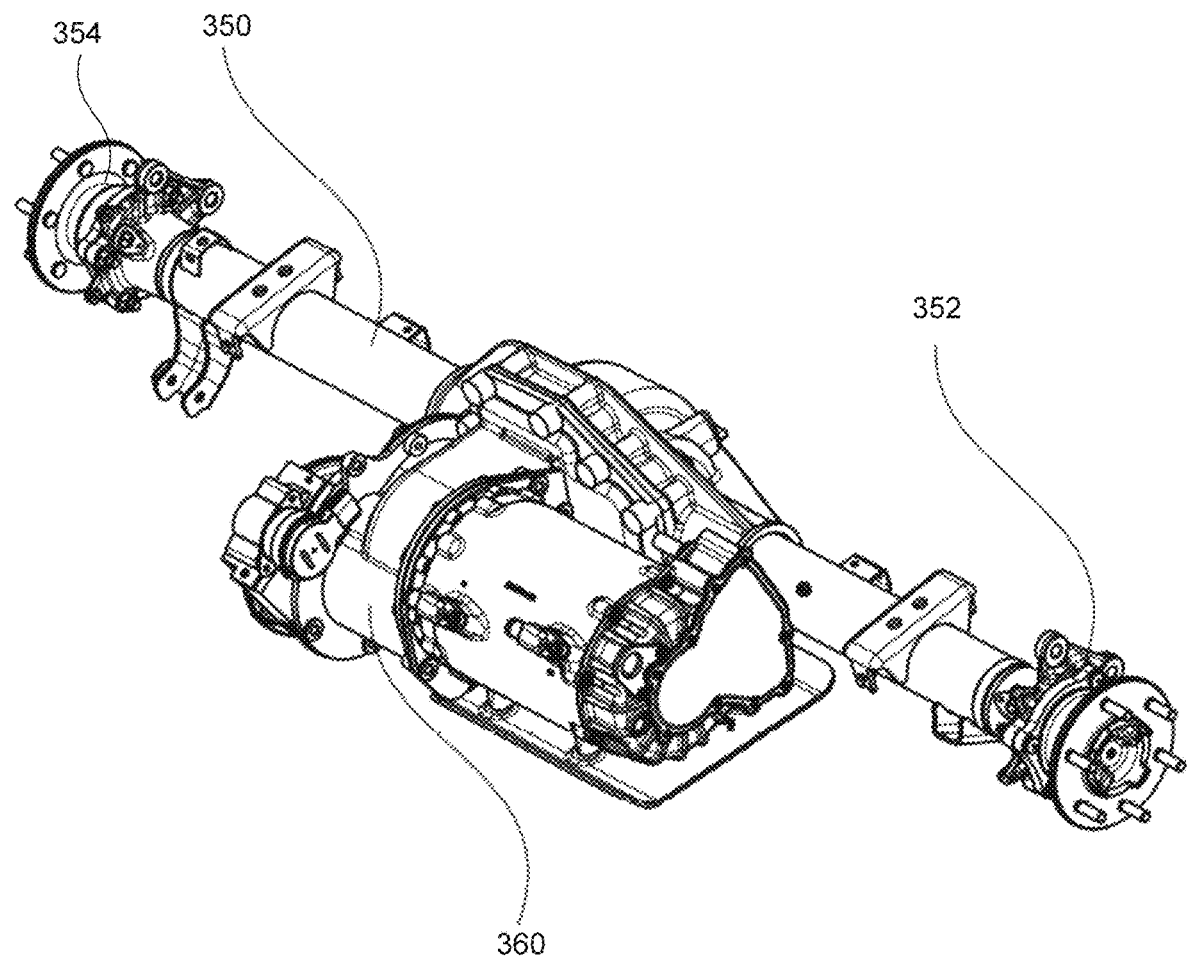
FIG. 7 is a perspective view of a slave axle in accordance with an example embodiment.

In reference to FIG. 2, various components of the chassis 110, and the third and fourth suspension assemblies 140 and 150 are shown in isolation in accordance with an example embodiment. Meanwhile, FIG. 3 shows various components of the payload extension kit 160 in isolation in accordance with an example embodiment. FIGS. 4-6 show different perspectives of the payload extension kit 160 of FIG. 3 attached to the components of the chassis 110 shown in FIG. 2. FIG. 7 illustrates structures forming the electric motor 190 and "lazy" or hybrid drive axle 192 of FIG. 1.

Referring now to FIGS. 2-7, the chassis 110 of FIG. 1 may include a first longitudinal frame member 200 on a first side of the chassis 110, and a second longitudinal frame member 202 on a second side of the chassis 100. Any suitable number of transverse frame members 206 may extend between the first and second longitudinal frame members 200 and 202. A distance (D1) may be defined between the first and second longitudinal frame members 200 and 202. Although a distance between the first and second longitudinal frame members 200 and 202 may vary along the length thereof, and in some cases, the chassis 110 may include other longitudinal frame members that may be spaced apart by more or less than the distance (D1), the distance (D1) may generally be fixed at a rear end of the chassis 110 (which is the portion shown in FIGS. 2-6).

In an example embodiment, the first and second longitudinal frame members 200 and 202 may each include a number of attachment points, which may be employed to operably couple the first and second longitudinal frame members 200 and 202 to the payload extension kit 160. Some such attachment points are shown, for example, in FIG. 2. In this regard, vertical fixing members may be employed in connection with a first bracket 210 and a second bracket 212 that are shown attached to a lateral side of the first longitudinal frame member 200. Each of the first and second brackets 210 and 212 may include an attachment orifice that is oriented vertically (and also substantially perpendicular to a direction of extension of the first and second longitudinal frame members 200 and 202). Horizontal fixing members may also be employed in connection with a lateral receiving orifice 214 formed in a lateral side of each of the first and second longitudinal frame members 200 and 202. Of note, multiple instances of the lateral receiving orifice 214 may be included, and the lateral receiving orifice 214 may extend through opposing lateral sides of the first and second longitudinal frame members 200 and 202, in a horizontal direction (which is also substantially perpendicular to a direction of extension of the first and second longitudinal frame members 200 and 202). The vertical and horizontal fixing members may form part of the coupling assembly 164 of FIG. 1 and may be embodied as bolts that extend laterally (i.e., horizontally) and vertically to attach the payload extension kit 160 to the first and second longitudinal frame members 200 and 202.

In the example of FIG. 2, the third and fourth suspension assemblies 140 and 150 include a first leaf spring assembly 220 and a second leaf spring assembly 222, respectively. The first and second leaf spring assemblies 220 and 222 support axle assembly 230, which supports wheel hubs 232 and 234, respectively. The wheel hubs 232 and 234 in turn support the third and fourth wheels 142 and 152, respectively, of FIG. 1. The first and second leaf spring assemblies 220 and 222 may each be operably coupled to a respective one of the first and second longitudinal frame members 200 and 202 via anchor points that attach opposing ends of the first and second leaf spring assemblies 220 and 222 to the first and second longitudinal frame members 200 and 202, respectively. Although not required, the third and fourth suspension assemblies 140 and 150 may also include one or more dampers or shocks (e.g., damper 236), which may further support the axle assembly 230 relative to the first and second longitudinal frame members 200 and 202, respectively.

As noted above, the components shown in FIG. 2 may (along with other components) enable the vehicle 100 to be operable at a given payload capacity. By adding the payload extension kit 160 of FIG. 3 to the components shown in FIG. 2, the given payload capacity may be increased. However, as can be appreciated from the descriptions of FIG. 3-7 that follow, such payload increase can be achieved without any need for design changes or major modifications to the components of the vehicle 100 shown in FIG. 2.

Referring now specifically to FIGS. 3-6, the payload extension kit 160 includes its own sub-frame extension 162 (see FIG. 1), which may be embodied by a first longitudinal sub-frame member 300 on one side and a second longitudinal sub-frame member 302 on the opposite side of the payload extension kit 160. A transverse sub-frame member 304 may be provided to define a distance (D2) between the first and second longitudinal sub-frame members 300 and 302. The distance (D2) may be the same as the distance (D1) described above.

Each of the first and second longitudinal sub-frame members 300 and 302 may include a first lateral bracket 310 and a second lateral bracket 312. The first and second lateral brackets 310 and 312 may be attached to an outer lateral side of the first and second longitudinal sub-frame members 300 and 302. The first and second lateral brackets 310 and 312 may be spaced apart from each other by the same distance at which the first and second brackets 210 and 212 are spaced apart from each other. The first and second lateral brackets 310 and 312 may each have a receiving orifice formed therein. Accordingly, when the first and second longitudinal sub-frame members 300 and 302 are provided on top of and in alignment with the first and second longitudinal frame members 200 and 202, the vertical fixing members that pass through the first and second brackets 210 and 212 described above may also be passed through the first and second lateral brackets 310 and 312 to bind the respective brackets to each other.

The first and second longitudinal sub-frame members 300 and 302 may each also include a sleeve bracket 320. Each instance of the sleeve bracket 320 may include a side plate (e.g., an internal and external side plate) that are operably coupled to each other to form a channel into which the first and second longitudinal frame members 200 and 202 are enabled to slide. Thus, each instance of the sleeve bracket 320 may sleeve over a corresponding one of the first and second longitudinal frame members 200 and 202. The sleeve bracket 320 (on each side) may be fixedly coupled to a stub frame 322 and a suspension bolster 324. The stub frame 322 on each respective side of the payload extension kit 10 may be disposed directly below a portion of a corresponding one of the first or second longitudinal sub-frame members 300 or 302. In some embodiments, the stub frame 320 may be welded or bolted to each of the corresponding one of the first or second longitudinal sub-frame members 300 or 302 and to the corresponding one of the sleeve brackets 320. The transverse frame member 304 may extend between the sleeve brackets 320 and/or the suspension bolsters 324 to provide further support thereto.

The sleeve bracket 320 may include at least one lateral receiving orifice 326 that may align with the lateral receiving orifice 214 of the first or second longitudinal frame members 200 or 202. Thus, when the first and second longitudinal sub-frame members 300 and 302 are provided on top of and in alignment with the first and second longitudinal frame members 200 and 202, the horizontal fixing members that pass through the lateral receiving orifice 214 described above may also be passed through the lateral receiving orifice 326 of the sleeve bracket 320 to bind the sleeve bracket 320 to the corresponding one of the first or second longitudinal frame members 200 or 202. The stub frame 322 on each side of the payload extension kit 160 may effectively extend the length of the first and second longitudinal frame members 200 and 202, and may provide an anchoring point to which a removable tow bar 330 (represented by dashed lines in FIG. 3) may be attached.

The fifth and sixth suspension assemblies 170 and 180 may, in this example, include a third leaf spring assembly 340 and a fourth leaf spring assembly 342, respectively. The third and fourth leaf spring assemblies 340 and 342 may support slave axle assembly 350, which supports wheel hubs 352 and 354, respectively. The wheel hubs 352 and 354 in turn support the fifth and sixth wheels 172 and 182, respectively, of FIG. 1. Although not required, the fifth and sixth suspension assemblies 170 and 180 may also include one or more dampers or shocks (e.g., damper 356), which may further support the slave axle assembly 350 relative to the first and second longitudinal sub-frame members 300 and 302 (or the transverse sub-frame member 304). In the example shown, the dampers 356 may extend between the slave axle assembly 350 on one end thereof, and a mounting bracket 358 disposed on an internal lateral surface of the first or second longitudinal sub-frame member 300 or 302 (see FIG. 5).

The slave axle assembly 350 is an example of the "lazy" or hybrid drive axle 192 of FIG. 1, and may be operably coupled to electric motor 360, which may be an example of the electric motor 190 shown in FIG. 1. Unlike the first and second leaf spring assemblies 220 and 222 of FIG. 2, which are anchored directly to their respective first and second longitudinal frame members 200 and 202, the third and fourth leaf spring assemblies 340 and 342 are anchored differently. In this regard, a first (e.g., front) end of each of the third and fourth leaf spring assemblies 340 and 342 may be operably coupled to the axle assembly 230 via a bolt-on bracket assembly 370. Note that only one instance of the bolt-on bracket assembly 370 is shown in FIG. 3, but two mirrored instances will normally be provided with one for each respective one of the third and fourth leaf spring assemblies 340 and 342. Meanwhile, a second (rear) end of each of the third and fourth leaf spring assemblies 340 and 342 may be operably coupled to the slave axle assembly 350 (e.g., via coupler 372). A middle portion of each of the third and fourth leaf spring assemblies 340 and 342 may be operably coupled to the suspension bolster 324.

In this regard, the suspension bolster 324 may taper to an apex (e.g., terminating at a V shape) as the suspension bolster 324 extends away from the first or second longitudinal sub-frame member 300 or 302. The middle portion of the third and fourth leaf spring assemblies 340 and 342 may be pivotally supported at the apex of the suspension bolster 324 on each respective side of the payload extension kit 160. Thus, whereas the axle assembly 230 of the vehicle 100 is supported at a middle portion (e.g., from an underside of the middle portion) of the first or second leaf spring assembly 220 or 222, the slave axle assembly 350 is supported at a rear portion (e.g., from an underside of the rear portion) of the third or fourth leaf spring assembly 340 or 342. This arrangement may provide a load split between rear axles (e.g., the axle assembly 230 acting as a master, and the slave axle assembly 350), which may be achieved by a rocker ration of the spring assemblies. In an example embodiment, a 60/40 load split may be provided to allow the axle assembly 230 of the vehicle 100 (which is a driven axle), to act as a master relative to the slave axle assembly 350, which acts as a "lazy" axle. The arrangement may be referred to as a slave half leave with lazy rear axle, and may facilitate maintaining traction at all times for the vehicle 100 with the addition of the payload extension kit 160. This arrangement is perhaps best seen in FIG. 6, which is a section view along the longitudinal centerline of the vehicle 100 in which arrow 380 shows the forward direction (or front of the vehicle 100).

Notably, the 60/40 load split achieved by the depicted example could be modified in alternative designs. Thus, for example, any desirable load split may be selected and correspondingly designed. The load leveling of the depicted example in FIG. 6 connects a rear leaf spring to a bottom side of a forward axle (among a pair of rear axles) so that no specific load leveling device is needed. However, a load leveling device could be used in some embodiments. For example, FIGS. 8 and 9 show an alternative payload extension kit 398 including a load leveling device 399 of an example embodiment.

Figure 8:
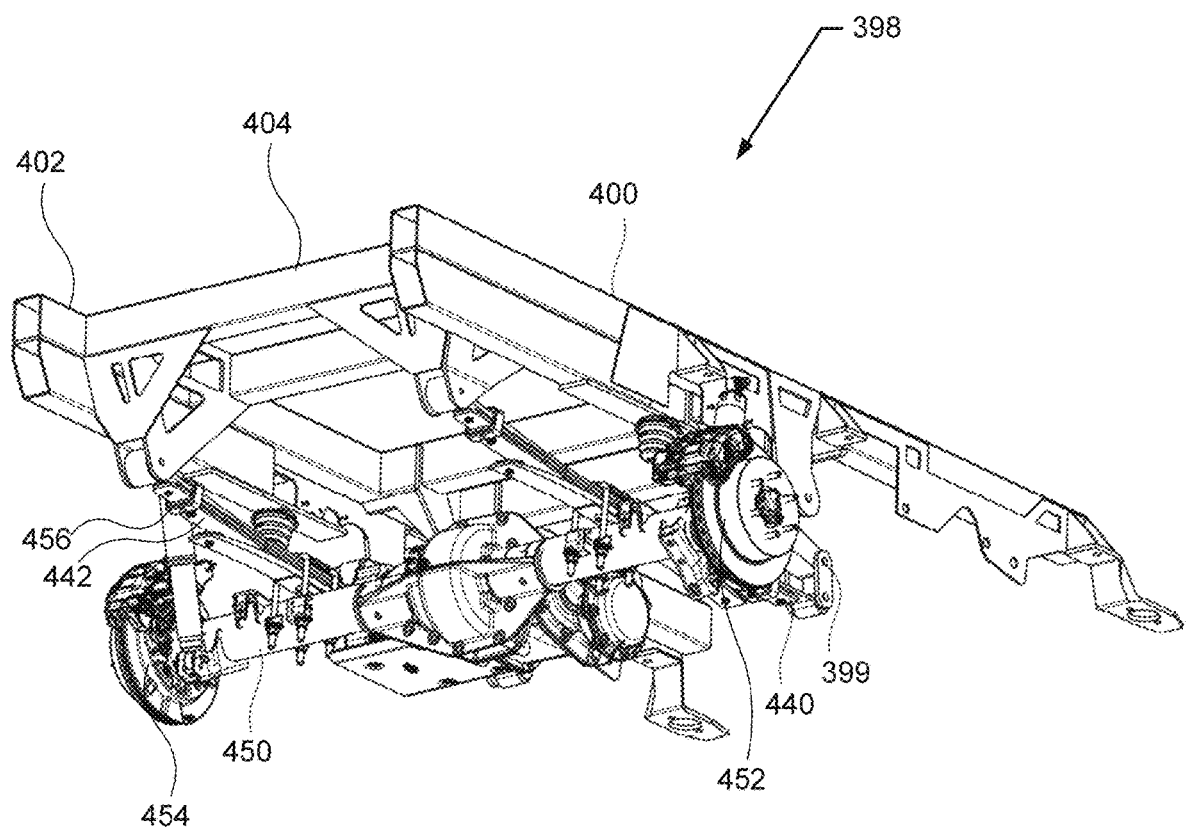
FIG. 8 is a perspective view of an alternative payload extension kit with a load leveling device.
Figure 9:
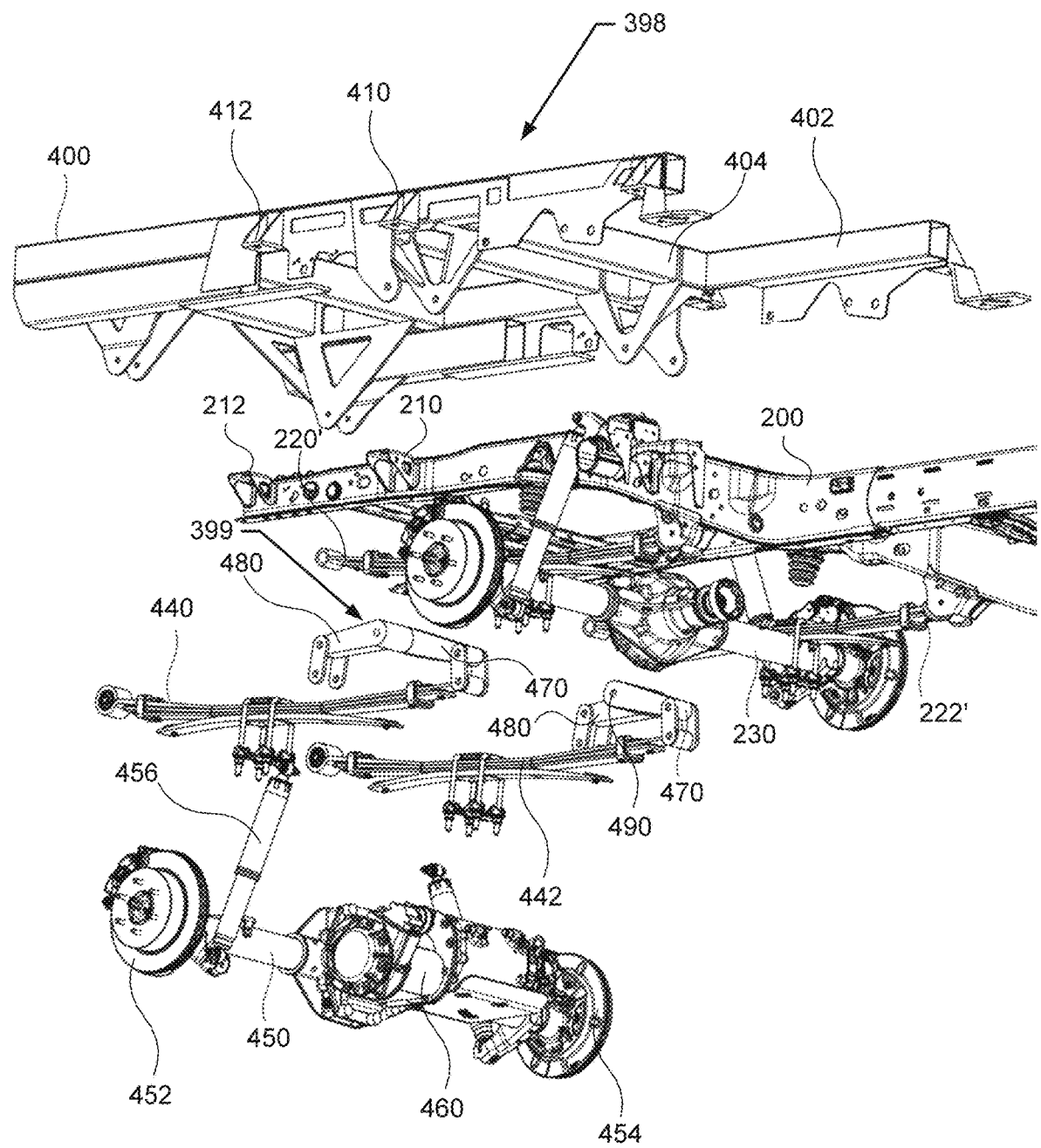
FIG. 9 is an exploded perspective view of the alternative payload extension kit with the load leveling device.

Referring now to FIGS. 8 and 9, the alternative payload extension kit 398 may include a different version of the sub-frame extension 162 (see FIG. 1), which may be embodied by a first longitudinal sub-frame member 400 on one side and a second longitudinal sub-frame member 402 on the opposite side of the payload extension kit 398. One or more transverse sub-frame members 404 may be provided to define a distance between the first and second longitudinal sub-frame members 400 and 402.

Each of the first and second longitudinal sub-frame members 400 and 402 may include at least a first lateral bracket 410 and a second lateral bracket 412. The first and second lateral brackets 410 and 412 may be attached to an outer lateral side of the first and second longitudinal sub-frame members 400 and 402. The first and second lateral brackets 410 and 412 may be spaced apart from each other by the same distance at which the first and second brackets 210 and 212 are spaced apart from each other. The first and second lateral brackets 410 and 412 may each have a receiving orifice formed therein as described above, in order to align with the first and second brackets 210 and 212 described above for fixing via a vertical fixing member. The first and second longitudinal sub-frame members 400 and 402 may each also be affixed to the first and second longitudinal frame members 200 and 202, respectively, via a horizontal fixing member similar to the description provided above.

The fifth and sixth suspension assemblies 170 and 180 of FIG. 1 may, in this example, include a third leaf spring assembly 440 and a fourth leaf spring assembly 442, respectively. The third and fourth leaf spring assemblies 440 and 442 may support slave axle assembly 450, which supports wheel hubs 452 and 454, respectively. The wheel hubs 452 and 454 in turn support the fifth and sixth wheels 172 and 182, respectively, of FIG. 1. Although not required, the fifth and sixth suspension assemblies 170 and 180 may also include one or more dampers or shocks (e.g., damper 456), which may further support the slave axle assembly 450 relative to the first and second longitudinal sub-frame members 400 and 402 (or the transverse sub-frame member 404).

The slave axle assembly 450 is another example of the "lazy" or hybrid drive axle 192 of FIG. 1, and may be operably coupled to electric motor 460, which may be an example of the electric motor 190 shown in FIG. 1. As shown in FIGS. 8 and 9, the first and second leaf spring assemblies 220' and 222' are modified so that they are not anchored directly to their respective first and second longitudinal frame members 200 and 202, but instead, at a rear end thereof, are anchored to the load leveling device 399. The third and fourth leaf spring assemblies 440 and 442 are also anchored to the load leveling device 399, and the geometries of the anchoring points are adjustable to change the load splitting ratio.

In this regard, the load leveling device 399 includes a front anchoring portion 470 and a rear anchoring portion 480 that are laterally and longitudinally offset from each other. In this example, the front anchoring portion 470 is located inwardly (i.e., closer to the longitudinal centerline of the vehicle) of the rear anchoring portion 480. The front and rear anchoring portions 470 and 480 are mounted from a common pivot axis 490, and the angles are adjustable as noted above to change the load split. Thus, as noted above, any desirable load split may be achieved.

A vehicle suspension system for enhancing payload capacity may therefore be provided. The vehicle suspension system may include a first suspension assembly operably coupling a first wheel to a chassis of a vehicle, a second suspension assembly operably coupling a second wheel to the chassis where the first and second wheels form a pair of front wheels, a third suspension assembly operably coupling a third wheel to the chassis, a fourth suspension assembly operably coupling a fourth wheel to the chassis where the third and fourth wheels forming a first pair of rear wheels, and a payload extension kit that is attachable to the chassis non-permanently. The payload extension kit may include a fifth suspension assembly operably coupling a fifth wheel to a sub-frame extension of the payload extension kit, and a sixth suspension assembly operably coupling a sixth wheel to the sub-frame extension, where the fifth and sixth wheels form a second pair of rear wheels.

The vehicle suspension system of some embodiments may include additional features, modifications, augmentations and/or the like to achieve further objectives or enhance performance of the assembly. The additional features, modifications, augmentations and/or the like may be added in any combination with each other. Below is a list of various additional features, modifications, and augmentations that can each be added individually or in any combination with each other. For example, the chassis may include a first longitudinal frame member, a second longitudinal frame member, and a transverse frame member extending between the first and second longitudinal frame members. The sub-frame extension may include a first longitudinal sub-frame member, a second longitudinal sub-frame member, and a transverse sub-frame member extending between the first and second longitudinal sub-frame members. The first longitudinal sub-frame member may be non-permanently fixed to the first longitudinal frame member, and the second longitudinal sub-frame member may be non-permanently fixed to the second longitudinal frame member via both a vertical fixing member and a horizontal fixing member. In an example embodiment, the vertical fixing member and the horizontal fixing member are each bolts. In some embodiments, the first and second longitudinal frame members may each include a first bracket on a lateral side thereof, the first and second longitudinal sub-frame members may each include a second bracket corresponding to the first bracket, and the first and second brackets may be affixed to each other via the vertical fixing member. In an example embodiment, a portion of each of the first and second longitudinal frame members may be received in a sleeve bracket that is affixed to a corresponding one of each of the first and second longitudinal sub-frame members. The vertical fixing member may operably couple the sleeve bracket to the corresponding one of each of the first and second longitudinal frame members. In some cases, the third and fourth suspension assemblies may include a first leaf spring assembly and a second leaf spring assembly, respectively, and the fifth and sixth suspension assemblies may include a third leaf spring assembly and a fourth leaf spring assembly, respectively. In an example embodiment, the first and second leaf spring assemblies may support a master axle at a middle portion of each of the first and second leaf spring assemblies, and the third and fourth leaf spring assemblies may be operably coupled to the master axle at a first end thereof, and operably coupled to a slave axle at a second end thereof. In some cases, a middle portion of each of the third and fourth leaf spring assemblies may be pivotally supported by a support bolster extending away from the first and second longitudinal sub-frame members, respectively. In an example embodiment, the slave axle may be operably coupled to an electric motor. In some cases, a rocker ration of the first and second leaf spring assemblies relative to the third and fourth leaf spring assemblies may establish a 60-40 load split between the master axle and the slave axle. In an example embodiment, the third and fourth leaf spring assemblies may be operably coupled to the master axle via a bolt-on coupler. In some cases, the fifth and sixth suspension assemblies may each further include a damper operably coupling the slave axle to the first and second longitudinal sub-frame members, respectively. In an example embodiment, the third and fourth wheels may be operably coupled to a first rear axle, and the payload extension kit may include an electric motor powering a second rear axle, thereby converting the vehicle to a plug-in hybrid electric vehicle (PHEV).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A vehicle suspension system comprising:
   a first suspension assembly operably coupling a first wheel to a chassis of a vehicle;
   a second suspension assembly operably coupling a second wheel to the chassis, the first and second wheels forming a pair of front wheels;
   a third suspension assembly operably coupling a third wheel to the chassis;
   a fourth suspension assembly operably coupling a fourth wheel to the chassis, the third and fourth wheels forming a first pair of rear wheels; and
   a payload extension kit that is attachable to the chassis non-permanently,
   wherein the payload extension kit includes a fifth suspension assembly operably coupling a fifth wheel to a sub-frame extension of the payload extension kit, and a sixth suspension assembly operably coupling a sixth wheel to the sub-frame extension, the fifth and sixth wheels forming a second pair of rear wheels,
   wherein the chassis comprises a first longitudinal frame member, a second longitudinal frame member, and a transverse frame member extending between the first and second longitudinal frame members,
   wherein the sub-frame extension comprises a first longitudinal sub-frame member, a second longitudinal sub-frame member, and a transverse sub-frame member extending between the first and second longitudinal sub-frame members,
   wherein the first longitudinal sub-frame member is non-permanently fixed to the first longitudinal frame member, and the second longitudinal sub-frame member is non-permanently fixed to the second longitudinal frame member via both a vertical fixing member and a horizontal fixing member, wherein the first and second longitudinal frame members each include a first bracket on a lateral side thereof, wherein the first and second longitudinal sub-frame members each include a second bracket corresponding to the first bracket, and wherein the first and second brackets are affixed to each other via the vertical fixing member.

2. The system of claim 1, wherein the vertical fixing member and the horizontal fixing member are each bolts.

3. The system of claim 1, wherein a portion of each of the first and second longitudinal frame members is received in a sleeve bracket that is affixed to a corresponding one of each of the first and second longitudinal sub-frame members, wherein the horizontal fixing member operably couples the sleeve bracket to the corresponding one of each of the first and second longitudinal frame members.

4. The system of claim 1, wherein the third and fourth suspension assemblies include a first leaf spring assembly and a second leaf spring assembly, respectively, and wherein the fifth and sixth suspension assemblies include a third leaf spring assembly and a fourth leaf spring assembly, respectively.

5. The system of claim 1, wherein the third and fourth wheels are operably coupled to a first rear axle, and wherein the payload extension kit includes an electric motor powering a second rear axle, thereby converting the vehicle to a plug-in hybrid electric vehicle (PHEV).

6. A vehicle suspension system comprising:

a first suspension assembly operably coupling a first wheel to a chassis of a vehicle;

a second suspension assembly operably coupling a second wheel to the chassis, the first and second wheels forming a pair of front wheels;

a third suspension assembly operably coupling a third wheel to the chassis;

a fourth suspension assembly operably coupling a fourth wheel to the chassis, the third and fourth wheels forming a first pair of rear wheels; and a payload extension kit that is attachable to the chassis non-permanently, wherein the payload extension kit includes a fifth suspension assembly operably coupling a fifth wheel to a sub-frame extension of the payload extension kit, and a sixth suspension assembly operably coupling a sixth wheel to the sub-frame extension, the fifth and sixth wheels forming a second pair of rear wheels, wherein the third and fourth suspension assemblies include a first leaf spring assembly and a second leaf spring assembly, respectively, and wherein the fifth and sixth suspension assemblies include a third leaf spring assembly and a fourth leaf spring assembly, respectively, wherein the first and second leaf spring assemblies support a master axle at a middle portion of each of the first and second leaf spring assemblies, and wherein the third and fourth leaf spring assemblies are operably coupled to the master axle at a first end thereof, and operably coupled to a slave axle at a second end thereof.

7. The system of claim 6, wherein a middle portion of each of the third and fourth leaf spring assemblies is pivotally supported by a support bolster extending away from the first and second longitudinal sub-frame members, respectively.

8. The system of claim 6, wherein the slave axle is operably coupled to an electric motor.

9. The system of claim 6, wherein a rocker ratio of the first and second leaf spring assemblies relative to the third and fourth leaf spring assemblies establishes a selected load split between the master axle and the slave axle.

10. The system of claim 6, wherein the third and fourth leaf spring assemblies are operably coupled to the master axle via a bolt-on coupler.

11. The system of claim 6, wherein the fifth and sixth suspension assemblies each further comprise a damper operably coupling the slave axle to the first and second longitudinal sub-frame members, respectively.

12. A payload extension kit that operably couples to a chassis of a vehicle having a front pair of wheels and a first rear pair of wheels to increase a payload capacity of the vehicle, the payload extension kit comprising:

a sub-frame extension;

a pair of suspension assemblies operably coupling a second pair of rear wheels to the sub-frame extension, wherein the chassis comprises a first longitudinal frame member, a second longitudinal frame member, and a transverse frame member extending between the first and second longitudinal frame members, wherein the sub-frame extension comprises a first longitudinal sub-frame member, a second longitudinal sub-frame member, and a transverse sub-frame member extending between the first and second longitudinal sub-frame members, wherein the first longitudinal sub-frame member is non-permanently fixed to the first longitudinal frame member, and the second longitudinal sub-frame member is non-permanently fixed to the second longitudinal frame member via a removable fixing member, wherein the first and second longitudinal frame members each include a first bracket on a lateral side thereof, wherein the first and second longitudinal sub-frame members each include a second bracket corresponding to the first bracket, and wherein the first and second brackets are affixed to each other via a vertical fixing member.

13. The payload extension kit of claim 12, wherein the fixing member is a bolt.

14. The payload extension kit of claim 12, further comprising a sleeve bracket that is affixed to a corresponding one of each of the first and second longitudinal sub-frame members, wherein a portion of each of the first and second longitudinal frame members is received in the sleeve bracket, and wherein the horizontal fixing member operably couples the sleeve bracket to the corresponding one of each of the first and second longitudinal frame members.

15. The payload extension kit of claim 12, wherein the first pair of rear wheels are supported by a third and fourth suspension assembly, respectively, the third and fourth suspension assemblies including a first leaf spring assembly and a second leaf spring assembly, respectively, and wherein the first and second suspension assemblies include a third leaf spring assembly and a fourth leaf spring assembly, respectively.

16. The payload extension kit of claim 15, wherein the third and fourth leaf spring assemblies support a master axle at a middle portion of each of the third and fourth leaf spring assemblies, and wherein the first and second leaf spring assemblies are operably coupled to the master axle at a first end thereof, and operably coupled to a slave axle at a second end thereof.

17. The payload extension kit of claim 16, wherein a middle portion of each of the first and second leaf spring assemblies is pivotally supported by a support bolster extending away from the first and second longitudinal sub-frame members, respectively.

\* \* \* \* \*